United States Patent [19]
Gabbay

[11] Patent Number: 5,939,340
[45] Date of Patent: Aug. 17, 1999

[54] ACARICIDAL FABRIC

[75] Inventor: Jeffrey Gabbay, Jerusalem, Israel

[73] Assignee: MTC Medical Fibers Ltd, Jerusalem, Israel

[21] Appl. No.: 09/201,939

[22] Filed: Dec. 1, 1998

Related U.S. Application Data

[63] Continuation-in-part of application No. 08/693,656, Aug. 9, 1996, Pat. No. 5,871,816, and a continuation-in-part of application No. 08/693,657, Aug. 9, 1996.

[51] Int. Cl.⁶ .................. D03D 3/00; B32B 7/00
[52] U.S. Cl. .................. 442/229; 442/239; 442/263; 442/264; 442/268; 442/287; 442/377; 442/381; 442/395
[58] Field of Search .................. 442/6, 10, 11, 442/13, 228, 229, 231, 238, 243, 261, 263, 264, 268, 376, 377, 379, 381, 395, 287

[56] References Cited

U.S. PATENT DOCUMENTS

| | | |
|---|---|---|
| 1,210,375 | 12/1916 | Decker . |
| 3,308,488 | 3/1967 | Schoonman . |
| 4,201,825 | 5/1980 | Ebneth . |
| 4,278,435 | 7/1981 | Ebneth . |
| 4,666,940 | 5/1987 | Bischoff et al. . |
| 5,316,837 | 5/1994 | Cohen . |
| 5,405,644 | 4/1995 | Ohsumi et al. . |
| 5,744,222 | 4/1998 | Sugihara . |
| 5,856,248 | 1/1999 | Weinberg . |
| 5,869,412 | 2/1999 | Yenni, Jr. et al. . |
| 5,871,816 | 2/1999 | Tal . |

*Primary Examiner*—William Krynski
*Assistant Examiner*—J. M. Gray
*Attorney, Agent, or Firm*—Townsend & Townsend & Crew

[57] ABSTRACT

The present invention provides a multilayer laminated acaricidal fabric comprising:

a) a bottom layer of metallized textile comprising:
  (i) a textile including fibers selected from the group consisting of natural fibers, synthetic cellulosic fibers, regenerated protein fibers, acrylic fibers, polyolefin fibers, polyurethane fibers, vinyl fibers, and blends thereof, and
  (ii) a plating including an acaricidally effective amount of ionic copper, the metallized textile characterized in that the plating is directly bonded to said fibers;

b) an intermediate air and vapor permeable thermoplastic membrane having pores of up to 10 angstrom; and c) an outer fabric layer, the thermoplastic membrane serving as a bonding layer effecting the lamination between the bottom and the outer fabric layers, as well as a barrier preventing the passage therethrough of allergens from mites killed by the acaricidal fabric.

7 Claims, No Drawings

ACARICIDAL FABRIC

The present specification is a continuation-in-part of U.S. Ser. No. 08/693,656 filed Aug. 9, 1996, now U.S. Pat. No. 5,871,816, and a continuation-in-part of U.S. Ser. No. 08/693,657 filed Aug. 9, 1996 pending.

The present invention relates to an acaricidal fabric. More particularly, the present invention relates to a multi-layer acaricidal fabric.

Both in WO 09/06508 and in WO 98/06509, the teachings of which are incorporated herein by references, the state of the prior art is described as follows:

Beds commonly are infested by tiny mites. These mites eat bacteria and fungi that grow on epidermal scales shed by people who sleep in the beds. Fragments of dead mites and mite excreta are allergens, to which asthmatics and people with dust allergens are sensitive. It has been found that some metals and metal oxides, notably Cu, CuO, Ag and $Ag_2O$, repel mites.

The conventional method for making textiles inhospitable to mites is to treat the textiles with an organic acaricide such as benzyl benzoate. For example, Bischoff et al., in U.S. Pat. No. 4,666,940, teach an acaricide that includes benzyl benzoate and a solid powder carrier whose particles are of a size suitable for ingestion by the mites. These acaricides must be replaced every time the textile is laundered. Thus, Bischoff et al. recommend using their acaricide on textiles, such as carpets and upholstery, that are not laundered frequently. An inherently acaricidal bedsheet would keep a bed free of mites, even after multiple launderings, without the need to reapply acaricide to the bedsheet.

The methods known in the prior art for bonding a metal or a metal oxide to a textile generally require that the metal or its oxide be bonded indirectly to the textile. For example, the metal may be reduced to a powder and suspended in a binder. The binder-metal mixture then is applied to the textile, with the binder, and not the metal, bonding to the textile. Alternatively, the metal is reduced to a powder, an adhesive is applied to the textile, and the metal powder is spread on the adhesive. Examples of both such methods may be found in U.S. Pat. No. 1,210,375, assigned to Decker. These methods are less than satisfactory for the above applications, for at least two reasons. First, the carrier or adhesive may entirely encapsulate the metal or metal oxide powder particles, inhibiting their contact with mites, fungi and bacteria, and making the textile useless as an acaricide, fungicide, or bactericide. Second, multiple launderings tends to weaken the binder or adhesive and loosen or remove the particles.

Two notable exceptions to the general rule that metals and metal oxides have not heretofore been bonded directly to textiles are nylon textiles and polyester textiles, which may be plated with metals using standard electrolyses plating processes for plating plastics. The specific electrolyses plating methods known to the art are restricted in their applicability to only certain plastics, however. In particular, they are not suited to natural fibers, nor to most synthetic fibers.

With this state of the art in mind, both of said publications taught various aspects of a textile with a full or partial metal or metal oxide plating directly and securely bonded to the fibers thereof.

More specifically, in WO 98/06509 there is provided a process comprising the steps of: (a) providing a metallized textile, the metallized textile comprising: (i) a textile including fibers selected from the group consisting of natural fibers, synthetic cellulosic fibers, regenerated fibers, acrylic fibers, polyolefin fibers, polyurethane fibers, vinyl fibers, and blends thereof, and (ii) a plating including materials selected from the group consisting of metals and metal oxides, the metallized textile characterized in that the plating is bonded directly to the fibers; and (b) incorporating the metallized textile in an article of manufacture.

In the context of said invention the term "textile" includes fibers, whether natural (for example, cotton, silk, wool, and linen) or synthetic yarns spun from those fibers, and-woven, knit, and non-woven fabrics made of those yarns. The scope of the invention includes all natural fibers; and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, but excluding nylon and polyester fibers, and blends thereof.

The invention comprised application to the products of an adaptation of technology used in the electrolyses plating of plastics, particularly printed circuit boards made of plastic, with metals. See, for example, Encyclopedia of Polymer Science and Engineering (Jacqueline I. Kroschwitz, editor), Wiley and Sons, 1987, vol. IX, pp 580–598. As applied to textiles, this process included two steps. The first step was the activation of the textile by precipitating catalytic noble metal nucleation sites on the textile. This was done by first soaking the textile in a solution of a low-oxidation-state reductant cation, and then soaking the textile in a solution of noble metal cations, preferably a solution of Pd++ cations, most preferably an acidic $PdCl_2$ solution. The low-oxidation-state cation reduces the noble metal cations to the noble metals themselves, while being oxidized to a higher oxidation state. Preferably, the reductant cation is one that is soluble in both the initial low oxidation state and the final high oxidation state, for example Sn++, which is oxidized to Sn++++, or Ti+++, which is oxidized to Ti++++.

The second step was the reduction, in close proximity to the activated textile, of a metal cation whose reduction was catalyzed by a noble metal. The reducing agents used to reduce the cations typically were molecular species, for example, formaldehyde in the case of Cu++. Because the reducing agents were oxidized, the metal cations are termed "oxidant cations" herein. The metallized textiles thus produced were characterized in that their metal plating was bonded directly to the textile fibers.

In preferred embodiments, the article of manufacture referred to therein.

In WO 98106508 there is described and claimed a composition of matter comprising:

(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plating including materials selected from the group consisting of metals and metal oxides;

the composition of matter characterized in that the plating is bonded directly to the fibers.

The publication also claims a composition of matter comprising:

(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plurality of nucleation sites, each of said nucleation sites including at least one noble metal; the composition of matter characterized by catalyzing the reduction of at least one metallic cationic species to a reduced metal, thereby plating the fibers with the reduced metal.

In addition, the publication teaches and claims processes for producing the products.

A preferred process for preparing a metallized textile according to the publication comprises the steps of:

a) selecting a textile, in a form selected from the group consisting of yarn and fabric, the textile including fibers selected from the group consisting of natural fibers, synthetic cellulosic fibers, regenerated protein fibers, acrylic fibers, polyolefin fibers, polyurethane fibers, vinyl fibers, and blends thereof;

b) soaking the textile in a solution containing at least one reductant cationic species having at least two positive oxidation states, the at least one cationic species being in a lower of said at least two positive oxidation states;

c) soaking the textile in a solution containing at least one noble metal cationic species, thereby producing an activated textile; and d) reducing at least one oxidant cationic species in a medium in contact with the activated textile, thereby producing a metallized textile.

While the metallized fabrics produced according to the publications are effective acaricides, it have been found that they do not serve to improve the symptoms of children and others with asthma and house dust mite hypersensitivity.

It is to be noted that this problem was also reported with use of a fabric called INTERVENT ® (W.L. Gore Associate Livingstone U.K.), which fabric is a water vapor permeable (pore size O.I. $\mu$m), but HDM allergen impermeable. (J. M. Frederick et al., Eur. Respir. J. 1997 10:361–366).

Furthermore, there existed a problem of consumer acceptance for a metallized fabric for use as a bedsheet, mattress cover, or upholstery product.

With this state of the art in mind, and after further research and development there is now provided according to the present invention a multilayer laminated acaricidal fabric comprising:

a) a bottom layer of metallized textile comprising:
(i) a textile including fibers selected from the group consisting of natural fibers, synthetic cellulosic fibers, regenerated protein fibers, acrylic fibers, polyolefin fibers, polyurethane fibers, vinyl fibers, and blends thereof; and
(ii) a plating including an acaricidally effective amount of ionic copper, the metallized textile characterized in that the plating is directly bonded to the fibers;

b) an intermediate air and vapor permeable thermoplastic membrane having pores of up to 10 angstrom; and c) an outer fabric layer, the thermoplastic membrane serving as a bonding layer effecting the lamination between the bottom and the outer fabric layers, as well as a barrier preventing the passage therethrough of allergens from mites killed by the acaricidal fabric.

As will be realized, the present invention provides a textile acaricidal fabric composed of three layers, as follows:

a) A bottom textile layer which has been treated with an acaricide to form a metallized textile, as described, e.g., in U.S. Ser. No. 08/693,656. This fabric can be a woven or non-woven fabric containing sufficient acaricidal material to be effective against the dust mites located on the mattress, or in the furniture, or in any other item upon the fabric is placed. The fabric can be of any weight provided that the weave is not so open that it leaves more than a small percentage of the area covered in an untreated state. The amount of open space is a function of the efficacy of the acaricide being used and may be any amount between 10% and 30%. The fiber content of the fabric can be any that lends itself to good bonding with the acaricide and in especially preferred embodiments the fabric is selected from the group consisting of cotton, a polyester-cotton blend, and an acrylic-cotton blend.

b) The intermediate layer is a breathable membrane that is thermoplastic in nature. A preferred membrane composition is a polyether based polyurethane, having pores small enough to stop liquids and all solids. The pore size of this type of membrane is up to 10 angstroms to assure that the membrane is air and vapor permeable, but impermeable to allergens. The membrane serves to effect the bonding and lamination of the two fabric layers and is strong enough to remain intact after lamination as a single sheet with no breaks or cracks to assure that allergens do not pass therethrough even after repeated washings.

c) The outer fabric layer may be woven or non-woven and is preferably a comfortable, soft sheeting with an eye-pleasing appearance. In preferred embodiments the fabric may be treated with a silicon or other stain resistant finishing formula.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Step A:

A metallized fabric was prepared as described in Example 1 of WO98/06508.

A dilute acidic solution of $SnCl_2$ was prepared by dissolving $SnCl_2$ and concentrated HCl in water.

A dilute acidic solution of $PdCl_2$ was prepared by dissolving $PdCl_2$ 10 and concentrated HCl and water.

A cotton fabric 250×250 cm was activated as follows:

Soak in a bath of the $SnCl_2$ solution

Soak in a bath of the $PdCl_2$ solution.

A dilute basic $CuSO_4$ solution was prepared by dissolving $CuSO_4$ and NaOH (in approximately equal weight proportions), a chelating agent, and polyethylene glycol in water.

The activated cotton fabric and formaldehyde were added to the $CuSo_4$ solution under a pure oxygen atmosphere. After between 2 minutes and 10 minutes, the cotton fabric was removed.

The palladium deposited on the cotton fabric in the activation step catalyzed the reduction of the Cu++ by the formaldehyde, providing a layer of copper tightly and intimately bonded to the fibers of the cotton fabric. The fabric, which initially was white in color, now as the color of copper metal, while retaining the flexibility and physical characteristics of the original fabric. The metallic copper color remained unchanged after several launderings.

The configuration of the bath is such that in the Copper Sulfate step the fabric is set up vertically and not in the tradition horizontal pile to allow a clean reduction on to the fabric surface of the desired copper. The vertical positioning of the fabric is done with the aid of or plurality of poles set up on a frame in an array similar to two spaced-apart rung ladders with the poles acting as the rungs. The fabric is interwoven in a repeating switchback array on the poles of the frame in such a way that at no place does the fabric touch other parts of the fabric. This configuration also allows the escape of gases as the chemicals react with one another thereby yielding a clean copper reduction on the fabric.

Step B:

The metallized fabric of Step A and a commercially bought dyed and finished but unsewn cotton fabric are laminated together through heat rollers at a temperature of 180° C. with a breathable polyether-based polyurethane film placed therebetween and serving as the adhesive for the laminate.

The film is prepared from pellets of a polyether based polyurethane available in the market place as ESTANE® by BF Goodrich, however other commercial films such as those produced by DuPont, ICI, Akzo, and Allied Chemical can also be used. The pellets were run through a standard air blown extruder of a thermoplastic polyether based polyurethane. The process was carried out at temperatures of between 150° C. and 180° C. and depending on the strength of the material involved was extruded to the minimum possible thickness. In most cases, this thickness is between 10 and 20 microns. The thinnest possible film that is still workable in standard machinery is sought since there is a direct relationship between film thickness and breathability. The thinner the film the higher the level of the Moisture Vapor Transmission (MVT). A typical MVT level should be about 5000 grams per square meter at 23 degrees Centigrade and 50% humidity. Higher MVT's are obtainable and some of the newer breathable polyurethane products have MCT's in the range of 20,000. The film is extruded in a width at least equal to the fabric widths.

Step C:

After lamination of the three layers, the resulting fabric is cut and sewn to fit the size of the mattress being tested.

The effectiveness of the acaricidal fabric of the present invention is tested by methods known per se.

The mattress is first vacuumed and the quantity of allergens on the mattress surface are established.

A mattress cover made from the multilayered acaricidal fabric of the present invention is then used to cover the mattress. Vacuuming of the mattress cover after two weeks reveals that substantially no allergens have passed therethrough, although vacuuming of the mattress surface after two weeks with the cover removed reveals the presence of allergens on the surface of the mattress, as welt as a substantial amount of dead mites.

Vacuuming of the mattress cover after four weeks reveals that substantially no allergens have passed therethrough, and vacuuming of the mattress surface with the cover removed reveals that substantially all of the allergens have disappeared from the mattress showing that the acaricidal fabric has effectively killed the mites in the mattress.

As will be realized from the above, the novel cover of the present invention serves to provide immediate protection from allergens, while the acaricidal underside of the fabric kills the mites and within a month mites are no longer contained in the mattress to manufacture further allergens.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A multilayer laminated acaricidal fabric comprising:
    a) a bottom layer of metallized textile comprising:
        (i) a textile including fibers selected from the group consisting of natural fibers, synthetic cellulosic fibers, regenerated protein fibers, acrylic fibers, polyolefin fibers, polyurethane fibers, vinyl fibers, and blends thereof, and
        (ii) a plating including an acaricidally effective amount of ionic copper, said metallized textile characterized in that said plating is directly bonded to said fibers;
    b) an intermediate air and vapor permeable thermoplastic membrane having pores of up to 10 angstrom; and
    c) an outer fabric layer, said thermoplastic membrane serving as a bonding layer effecting the lamination between said bottom and said outer fabric layers, as well as a barrier preventing the passage therethrough of allergens from mites killed by said acaricidal fabric.

2. A multilayer laminated acaricidal fabric according to claim 1, wherein said textile is a woven fabric.

3. A multilayer laminated acaricidal fabric according to claim 1, wherein said textile is a non-woven fabric.

4. A multilayer laminated acaricidal fabric according to claim 1, wherein said textile has an open space of between 10 and 30%.

5. A multilayer laminated acaricidal fabric according to claim 1, wherein said membrane is a polyether-based polyurethane.

6. A multilayer laminated acaricidal fabric according to claim 1, wherein said outer fabric layer is a woven fabric.

7. A multilayer laminated acaricidal fabric according to claim 1, wherein said outer fabric layer is a non-woven fabric.

* * * * *